April 12, 1955
F. J. PILAS
2,706,232
COMBINATION JIG AND WELDING APPARATUS
Filed Dec. 5, 1951
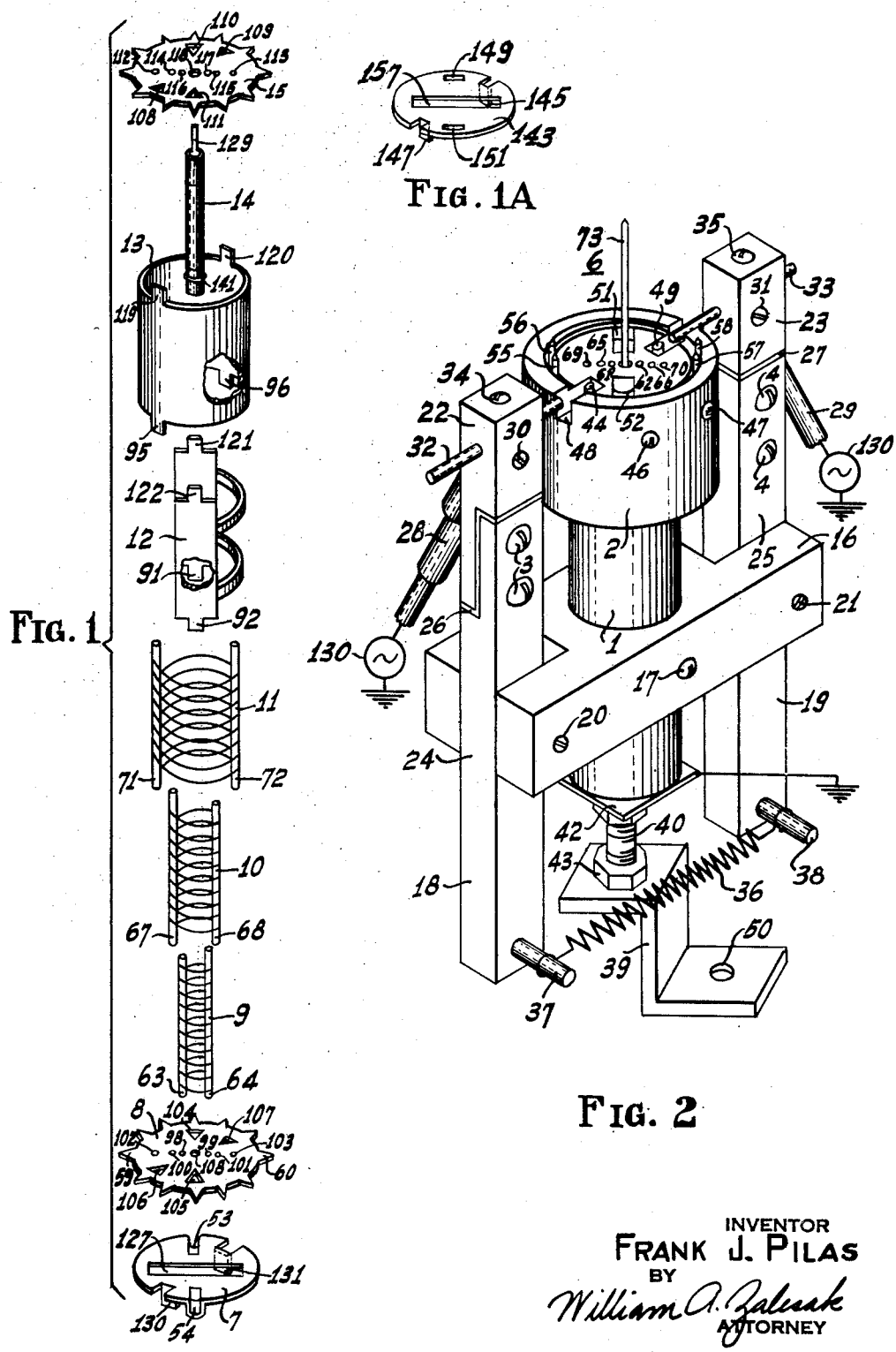
INVENTOR
FRANK J. PILAS
BY
William A. Zaluzak
ATTORNEY

United States Patent Office 2,706,232
Patented Apr. 12, 1955

2,706,232
COMBINATION JIG AND WELDING APPARATUS

Frank John Pilas, Kearny, N. J., assignor to Radio Corporation of America, a corporation of Delaware Application December 5, 1951, Serial No. 260,001

5 Claims. (Cl. 219—4)

This invention pertains to an apparatus for assembling the components of an electron discharge tube and particularly to a novel combination of means for retaining said components in assembled relationship and, while so retained, welding the components together.

Present day vacuum tubes generally comprise a plurality of small and delicate components assembled in close and critical spaced relationship. Because the tube components are so delicate and the spacing thereof is so critical, it is desirable to assemble them with a minimum number of operations and particularly a minimum of manual manipulation.

Ordinarily the tube components, which generally comprise a cathode and cathode heater, one or more grids, an anode and the associated support rods and insulating spacers are assembled on a jig and then the assembled tube mount is manually removed from the jig and, by additional manual operations, the components are welded together at the desired places by moving the assembly to different positions on the welding electrodes.

Obviously such a procedure exposes the assembled components to excessive manual manipulation before the final weld is effected and as a result there is danger of distorting the components and upsetting the critical spatial relationships.

Accordingly, the principal object of this invention is to provide an improved and novel apparatus for assembling and welding the components of a tub and which reduces the number of manual operations and thus the danger of upsetting the spatial relationships between said components or otherwise damaging the parts during assembly and welding operations.

In general the invention is accomplished by providing a jig of novel design for assembling tube components, with a pair of pivoted arms bearing welding electrodes so designed that welding can take place automatically on the jig while the tube components are retained in assembled relationship. The arms are spring biased so that the welding electrodes are normally out of operative relationship with stationary electrodes which are integral with the jig which provides a common return path for the welding current. Light manual pressure applied to the arms in sufficient to move the electrodes into operative relationship with their stationary mates whereby the tube components are welded together at predetermined points.

The invention will be more fully described with reference to the single sheet of drawings wherein:

Fig. 1 is an exploded perspective view of the components of the particular vacuum tube described below;

Fig. 1a is a perspective view of a top end plate member for use with an alternative mount; and, Fig. 2 is a perspective view of the combination jig and welding apparatus for assembling and welding the tube components.

The particular description which follows is directed to the assembly of a pentode which consists, in the present example, of an indirectly heated cathode, control, screen and suppressor grids, an anode, an outer shield and end spacer members, but it is clear that it could be used to assemble any other type of electron discharge device.

Referring to Fig. 1, the particular vacuum tube described herein includes a slotted base shield plate 7 having notches 53 and 54 and tabs 130 and 131 and lower and upper insulating disks 8 and 15 having a plurality of openings and projections for retaining the various support elements of the tube components and thus supporting the components in their correct spatial relationships. The disks may be made of mica or any other suitable insulating material.

An indirectly heated cathode 14 is provided with a lower support area having a shoulder 141 which retains the cathode in the opening 108 in the lower mica disk 8 and an upper support member 129 which is arranged to be inserted into the opening 118 in the upper mica disk 15. A control grid 9, which is arranged to surround the cathode 14, is provided with side rods 63 and 64 the lower ends of which are adapted to be inserted into the openings 98 and 99 in the lower mica disk 8 and the upper ends of which are adapted to be inserted into the openings 116 and 117 in the upper mica disk 15.

A screen grid 10, which is designed to surround the cathode and control grid, is provided with side rods 67 and 68 the lower and upper ends of which are adapted to be inserted into the openings 100 and 101 in the lower mica disk and openings 114 and 115 in the upper mica disk respectively.

A suppressor grid 11, designed to surround the cathode and control and screen grids, is provided with side rods 71 and 72, the lower and upper ends of which are adapted to be inserted into lower mica disk holes 102 and 103 and upper mica disk holes 112 and 113 respectively. An anode 12 is provided with lower end portions or tabs 91 and 92 and upper tabs 121 and 122 which are adapted to be inserted into lower disk openings 104 and 105 and upper disk openings 110 and 111 respectively.

A tubular shield 13, designed to surround the other above-mentioned electrodes, is provided with lower tabs 95 and 96 for insertion into the lower mica disk holes 106 and 107 and upper tabs 119 and 120 for insertion into the upper mica disk holes 108 and 109.

In an alternative arrangement of the tube components a second shield plate member 143 may be provided at the top of the mount. The top shield is provided with projecting tabs 145 and 147, which project upwardly when included in a mount, and slots 149 and 151.

When the components have been assembled, the tabs 91 and 92 of the anode 12 project through the openings 104 and 105 in the lower mica disk 8 and into the depressions in the embossments 53 and 54 in the base shield 7. In addition, the tabs 95 and 96 of the shield 13 project through the openings 106 and 107 in the mica 8 and lie adjacent to the tabs 130 and 131 of the base shield 7. In the alternative arrangement having the top shield 143, the tubular shield tabs 119 and 120 project through top mica holes 108 and 109 and register with the top shield tabs 147 and 145 respectively.

The tube components are assembled, as described above, on a jig 6 which consists generally of two conductive cylindrical portions 1 and 2. The lower portion 1 is provided with a suitable arrangement which supports the combined jig and welding apparatus. In this instance, the support arrangement consists of a bracket 39, one end of which may be mounted in operative position near an electrical supply source 130 on a nonconductive bench or table (not shown) by using a screw or bolt (not shown) threaded through a hole 50 in the bracket. The other end of the bracket is threaded on a screw 40 and retained by a locking nut 41 and, in addition, the screw 40 is threaded on a conductor 42 and into the body of the jig where it is retained by means of a locking nut 43. The conductor 42 is connected to ground by any suitable means. If the bracket is mounted on a metallic table, it should be insulated from the body of the jig.

Integral with the upper portion 2 of the jig 6 are the mounting and retaining recesses and elements for holding the above-enumerated tube components. The integral units are as follows: slots 51 and 52 for locating embossed portions 53 and 54 of the shield 7; index pins 55, 56 and 57, 58 for locating points 59 and 60 of mica disk 8; holes 61 and 62 are clearance holes for the lower ends of grid side rods 63 and 64 respectively of grid 9; holes 65 and 66 are clearance holes for the lower ends of grid side rods 67, 68 respectively of the grid 10; holes 69 and 70 are clearance holes for the lower ends of grid side rods 71 and 72 respectively of the grid 11; and a mandrel 73 is used for receiving and centering the tubular cathode 14.

The portion 2 of the jig 6 is provided with slots or recesses 48 extending inwardly from the periphery of the jig. Mounted within these slots are the vertically positioned auxiliary welding electrodes 44 and 49 which cooperate with the movable welding electrodes 32 and 33 when these latter electrodes are inserted into the slots, the slots being large enough so that no contact is made between the walls of the slots and electrodes 32 and 33. These slots also receive the tabs 130 and 131 of the shield 7 and 95 and 96 of shield 13 between the pairs of welding electrodes when the mount is assembled on the jig.

The jig 6 is attached through the portion 1 to a yoke 16 by a set screw 17. A pair of arms 18 and 19 are pivotally linked to the yoke 16 on dowel pins 20 and 21 respectively. The arms 18 and 19 are made up of two parts, lower portions 24 and 25, respectively and upper portions 22 and 23, respectively. The upper portions are electrically separated from the lower portions by means of insulating inserts 26 and 27. The upper portions 22 and 23 are physically connected to the lower portions 24 and 25 respectively by screws 3 and 4 which are insulatingly mounted by means of non-conductive tubular sleeves and washers. Electrical conductors 28 and 29, which are connected to the electrical source 130, are fastened to the upper arms 22 and 23 respectively by screws 30 and 31 respectively and welding electrodes 32 and 33 are similarly retained by set screws 34 and 35 respectively.

In order to retain the electrodes 32 and 33 away from the jig during assembly of the tube components to allow clearance for the parts to be mounted on the jig, the arms are spring-biased apart by means of a spring 36 which is attached between studs 37 and 38 which are provided in the lower portions 24 and 25 of the pivoted arms 18 and 19 respectively.

The electrical circuit for the welding current is as follows: the leads 28 and 29 are connected at one end to the electrical source 130 and at the other end to the movable electrodes 32 and 33 respectively. The stationary electrodes 44 and 49 and the body of the jig constitute the electrical return path through the conductor 42 to ground.

In operation of the apparatus, the shield 7 is mounted on the jig with the mandrel 73 projecting through the slot 127 and with the embossed portions 53 and 54 inserted in the slots 51 and 52 respectively on the jig. The tabs 130 and 131 of the shield are positioned externally of the stationary electrodes 44 and 49 respectively. The mica disk 8 is then threaded over the mandrel 73 which projects through the opening 108. The disk is arranged flush against the shield and in this position the projections 59 and 60 are retained between the pins 55, 56 and 57, 58 respectively.

The control grid is then mounted on the jig so that the lower end portions of the side rods 63 and 64 penetrate through the openings 98 and 99 in the mica disk 8 and into the holes 61 and 62 in the jig. The screen grid 10 is mounted on the jig with the lower ends of side rods 67 and 68 inserted through the apertures 100 and 101 in the mica disk and into the holes 65 and 66 in the jig. The suppressor grid is similarly mounted with the lower ends of side rods 71 and 72 inserted through the apertures 102 and 103 in the mica disk and into the holes 69 and 70 in the jig.

The anode 12 is then positioned on the jig with the lower tabs 91 and 92 projecting through the apertures 104 and 105 in the mica disk 8 and into the embossed portions 53 and 54 of the shield 7. Next, the tubular shield 13 is mounted in place with the lower tabs 95 and 96 inserted through the mica disk holes 106 and 107 and into position adjacent to the base shield tabs 130 and 131 respectively.

Finally, the upper mica disk 15 is positioned above the other components with the cathode tab 129 in the hole 118, the upper ends of the control grid side rods 63 and 64 in the holes 116 and 117, the upper ends of the screen grid side rods 67 and 68 in the holes 114 and 115, and the upper ends of the suppressor grid side rods 71 and 72 in the holes 112 and 113. The upper tabs 121 and 122 of the anode project into the openings 110 and 111 respectively of the disk 15 and the upper tabs 119 and 120 of the shield 13 project into the holes 108 and 109 respectively.

The final operations of securing the components in place comprises first bending one of the shield tabs 119 or 120 and one of the anode tabs 121 or 122 outwardly until they lie substantially in a horizontal plane and flush with the mica disk 15. This operation secures the disk 15 in place and insures against any of the components later falling out of position through the top of the mount. Next, the pivoted arms 18 and 19 are manually pressed together until the electrodes 32 and 33 contact the tabs 95 and 96 whereupon the flow of current through the welding circuit bonds said tabs to the tabs 130 and 131 of the flat shield 7. When the weld has been made, the manual pressure is released and the arms 22 and 23 move away from the jig under the influence of the biasing spring 36.

In the above-mentioned alternative embodiment, an end plate member 143 is arranged over the other components so that it does not short circuit any of the other members of the mount. The tabs 119 and 120 of the tubular shield are welded to the tabs 147 and 145 of the end plate 143. One of the tabs 121 or 122 of the anode is bent outwardly to lie horizontally over the mica disk 15 and the other tab is passed through one of the openings 149 or 151 which are designed to pass one of the anode tabs without short circuiting that electrode.

The assembled components are then removed from the jig whereupon they may be mounted in a tube or processed in some other fashion.

From the foregoing discussion, it will now be apparent that the invention provides a novel combined apparatus for assembling and welding the components of an electron discharge tube.

What is claimed is:

1. Apparatus for assembling a mount for an electron discharge device comprising parts including a tubular cathode, an anode and a plurality of other electrodes mounted between a pair of apertured insulating spacer members and a metal end plate member, said metal end plate member and at least one of said other electrodes having registering portions to be welded together, said apparatus comprising a vertically mounted jig having a supporting surface, said surface having a plurality of recesses for receiving end portions of said anode, said plurality of other electrodes and said metal end plate member, a plurality of pins extending upwardly adjacent opposite edges of said surface and adapted to desirably position one of said apertured insulating spacer members with the apertures therein in registry with said recesses, a mandrel extending upwardly from a central location on said surface for receiving said cathode, two of said recesses extending to the edge of said surface, fixed welding electrodes in said two of said recesses, said two of said recesses being adapted to receive said end portions of two of said parts to be welded in registering relation between the edge of said surface and said fixed electrodes, and a plurality of movable electrodes supported adjacent said jig and movable laterally of said surface into said two of said recesses and urging said registering portions against said fixed electrodes whereby said portions may be welded together when said movable electrodes are moved into said two of said recesses and against said registering portions, for locking said parts together.

2. Apparatus for assembling a mount for an electron discharge device comprising a cathode, an anode, a plurality of other electrodes and a tubular shield mounted between a pair of insulating members and an end plate shield member, said end plate member and said tubular shield having registering projecting tabs to be welded together, said apparatus comprising a vertically mounted jig having a supporting top surface for said mount, said top surface having a centrally positioned mandrel for receiving said cathode, a plurality of openings for receiving the end portions of said anode and said other electrodes, a pair of recesses for receiving the projecting tabs of said end plate and the end portions of said tubular shield, said projecting tabs and said end portions being arranged to lie in registering relationship with each other in said pair of recesses, said top surface also having a plurality of pins for retaining one of said insulating spacer members and a pair of stationary welding electrodes integral therewith in said pair of recesses; and a pair of movable welding electrodes supported adjacent said jig and movable into and out of operative relationship with said stationary electrodes whereby said projecting tabs of said end shield and said end portions of said tubular shield may be welded together.

3. Apparatus for assembling a mount for an electron discharge device comprising a cathode, an anode, a plurality of other electrodes and a tubular shield mounted between a pair of insulating members and a pair of end plate shield members, said end plate members and said tubular shield having two pairs of registering projecting tabs to be welded together, said apparatus comprising a vertically mounted jig having a supporting top surface for said mount, said top surface having a centrally positioned mandrel for receiving said cathode, a plurality of openings for receiving the end portions of said anode and said other electrodes, a pair of recesses for receiving one pair of the projecting tabs of said end plate and said tubular shield, said projecting tabs being arranged to lie in registering relationship with each other in said pair of recesses, said top surface also having a plurality of pins for retaining one of said insulating spacer members and a pair of stationary welding electrodes integral therewith in said pair of recesses, and a pair of movable welding electrodes supported adjacent said jig and movable into and out of operative relationship with said stationary electrodes whereby said projecting tabs of said end shield and said tubular shield may be welded together.

4. A combined assembling and welding apparatus for assembling and supporting a tubular electrode having two tabs extending from one end thereof and a metal end plate having two tabs extending from one face thereof to provide a loose assembly wherein said end plate extends across said end of the tubular electrode and said electrode tabs are adjacent and in face registering relation with said end plate tabs, and for welding said electrode tabs to said end plate tabs while said electrode and end plate are supported with said tabs thereof in said relation, said apparatus comprising a cylindrical support member having a flat end surface disposed in a horizontal plane, said member having two recesses extending inwardly from the periphery thereof and downwardly from said surface, said member having two fixed welding electrodes in said recesses spaced from said periphery, said recesses being adapted to receive said tabs between said welding electrodes and said periphery, for loosely disposing said tabs in said adjacent and face registering relation, and two other electrodes movably mounted on said support member and movable into said recesses laterally of said member for engaging and urging said tabs against said fixed electrodes for welding said tabs in said face registering relation.

5. A combined assembly and welding apparatus for electron tube parts comprising a tubular electrode having a flat tab extending from one end thereof and a metal end plate for said electrode having a flat tab extending perpendicularly from an edge portion of said plate, said apparatus comprising a cylindrical member supported in axially vertical position, said member having a horizontal upper surface, said member having a recess adjacent the periphery of said surface, said recess extending downwardly from said surface and horizontally to said periphery, a fixed welding electrode supported by said member in said recess and spaced from said periphery, said member being adapted to receive said electrode and end plate in coaxial relation therewith and with the tab of said electrode and the tab of said end plate received in said recess between said fixed welding electrode and the periphery of said member and adjacent said fixed electrode for loosely positioning said electrode and end plate in desired position, and a second welding electrode movably mounted on said cylindrical member, for movement transversely of the axis of said member and into said recesses, for engaging one of said tabs for welding said tabs with said electrode and end plate in said desired position.

References Cited in the file of this patent

UNITED STATES PATENTS

| | | |
|---|---|---|
| 2,290,748 | Hergenrother | July 21, 1942 |
| 2,314,882 | Hensel | Mar. 30, 1943 |
| 2,374,546 | Laico | Apr. 24, 1945 |
| 2,445,755 | Bannon | July 27, 1948 |